United States Patent

[11] 3,571,560

| [72] | Inventors | Ole K. Nilssen<br>Bensenville;<br>James R. Cherry, Barrington, Ill. |
|---|---|---|
| [21] | Appl. No. | 823,134 |
| [22] | Filed | May 8, 1969 |
| [45] | Patented | Mar. 23, 1971 |
| [73] | Assignee | Motorola, Inc.<br>Franklin Park, Ill. |

[54] AUXILIARY AUTOMOTIVE HEATING SYSTEM
9 Claims, 2 Drawing Figs.

[52] U.S. Cl. .................................................. 219/279,
219/202, 307/10
[51] Int. Cl. ...................................................... B60l 1/02
[50] Field of Search .......................................... 219/202,
279; 307/10; 322/28

[56] References Cited
UNITED STATES PATENTS
3,440,398 4/1969 Nilssen .......................... 219/279

Primary Examiner—J. V. Truhe
Assistant Examiner—C. L. Albritton
Attorney—Mueller and Aichele ABSTRACT: An electrical quick heat system for instantly supplying heat from resistive heating elements to the passenger compartment of an automotive vehicle. The quick heat system includes a heavy duty alternator, which is always directly connected to the resistive heating elements, and a switching mechanism for simultaneously bypassing the regulator to operate the alternator in its unregulated mode and for disconnecting the battery along with the automotive circuits from the alternator so that they are not subjected to the increased amplitude of the unregulated voltage.

PATENTED MAR 23 1971 3,571,560

Inventors
JAMES R. CHERRY
OLE K. NILSSEN
BY
Mueller, Aichele & Rauner
ATTYS.

AUXILIARY AUTOMOTIVE HEATING SYSTEM

BACKGROUND OF THE INVENTION

Most automotive vehicles, such as passenger cars, come equipped by the manufacturer with a conventional heater which has both a radiator through which the hot coolant from the engine is circulated for heating the surrounding air and a fan for forcing this heated air into the passenger compartment to provide a comfortable atmosphere therein and to defrost the windshield. It is well known that this type of heating system does not effectively produce heat until the engine has been running for whatever time interval is necessary for it to bring the coolant up to a sufficient temperature. During this time interval the driver and passengers of the automotive vehicle may be subjected to the cold atmosphere within the vehicle and frost may form on both the inside and outside of the windshield thereby limiting the visibility therethrough and consequently causing an unsafe condition.

To overcome these problems, auxiliary or secondary heating systems have been proposed which instantly change electrical energy, derived from the electrical system of the vehicle, into heat energy for utilization within the passenger compartment. These systems are usually employed during an interval of time beginning after the engine has been started and ending when the primary or conventional heating system becomes effective. One such heating system, suggested in the prior art, utilizes an ordinary automotive alternator and a switching system. When quick heat is desired, the switching system bypasses the voltage regulator circuit so that the alternator can develop an unregulated voltage of increased amplitude, while simultaneously switching the alternating voltage across resistive heating elements which are placed near the fan of the conventional heater so that the heat therefrom can be forced into the passenger compartment. When quick heat is no longer desired, the regulator bypass is removed and the voltage is switched from the heating elements.

One problem with the foregoing quick heat system is that the switching contacts between the alternator and heating elements must be capable of connecting and disconnecting currents of relatively large magnitudes. These contacts are subjected to the effects of arcing and their activating mechanism takes up space, adds cost and decreases the longevity and reliability of the quick heat system. Another problem is that the storage battery and automotive electrical circuits which might include the ignition system, lights, radio, etc. remain connected to the alternator even while it is operated in its unregulated mode thus subjecting them to voltages of greater amplitude than they are designed to withstand. Furthermore, the standard alternator, even while operating in its unregulated mode, may not supply enough electrical energy to the heating elements for defrosting the windows while satisfactorily heating the passenger compartment.

SUMMARY OF THE INVENTION

One object of this invention is to provide a simple, inexpensive, and reliable electrical power system for operating equipment for a vehicle.

Another object of this invention is to provide an improved auxiliary heating system for a vehicle which is capable of producing enough heat for simultaneously defrosting the windshield and heating the interior compartment of the vehicle without applying a voltage of excessive amplitude to the electrical system of the automobile.

One embodiment of the invention is an auxiliary or quick heat generator system for instantly supplying heat to the passenger compartment and defrosting system of an automotive vehicle. This system includes a heavy duty alternator, a switching mechanism and resistive heating elements. The heavy duty alternator has been designed to develop substantially more output voltage when operated in its unregulated mode than can be developed by an ordinary automotive alternator under similar conditions. Regardless of the mode of operation, the AC voltage output of the alternator is directly connected to the resistive heating elements which are physically located near the fan of the conventional heating system. The switching mechanism includes a relay having a first set of normally open contacts in a circuit for bypassing the voltage regulator and a second set of normally closed contacts between the DC output of the alternator and the battery for supplying the DC load. When this relay is energized, the second set of contacts is opened to disconnect the battery from the alternator, and the first set of contacts is closed to bypass the regulator so that the alternator operates in its unregulated mode. The DC power source which energizes the relay also supplies electrical power to the fan which forces the hot air from the heating elements into the passenger compartment. Deenergization of the relay returns the alternator to its regulated mode, reconnects the DC load, and shuts off the power to the fan. The system is designed so that the heating elements put out an unobjectionable amount of heat while the alternator is operating in its regulated mode and a substantially greater amount of heat when the alternator is operated in its unregulated mode thereby eliminating the prior art contacts between the heating elements and the alternator.

DETAILED DESCRIPTION OF THE PREFERRED EMBODIMENT

A preferred embodiment of the invention is in the form of a source of quick or instant heat which supplements the primary or conventional radiator-fan heating system of an automotive vehicle. The quick heat system is primarily used during the time between engine starting and when the primary heating system becomes effective.

Figure 1:
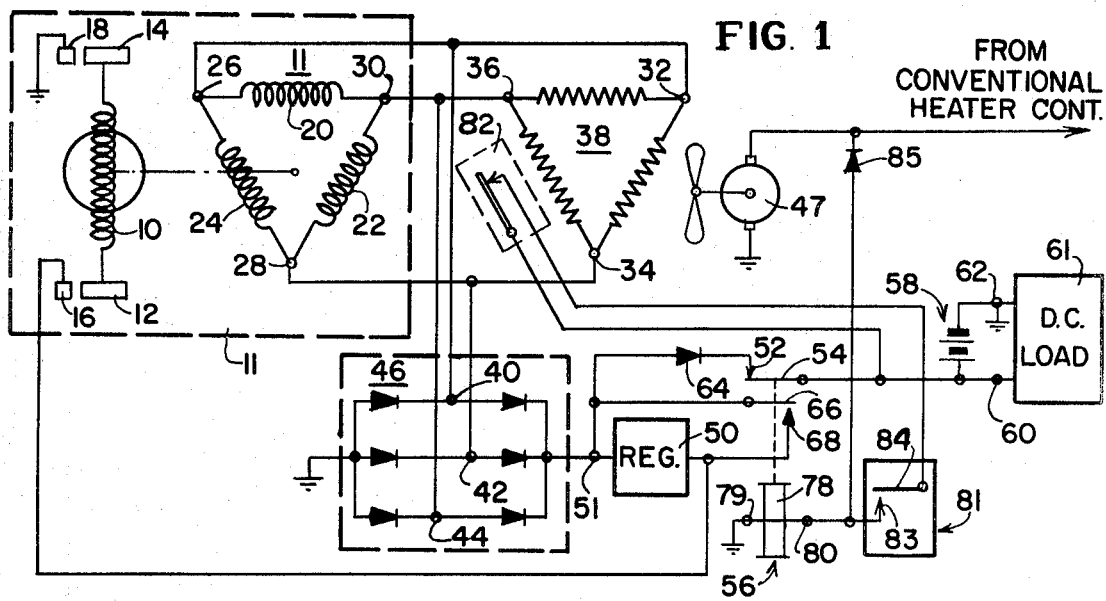
FIG. 1 shows a schematic diagram of the quick heat system of one embodiment of the invention.
Figure 2:
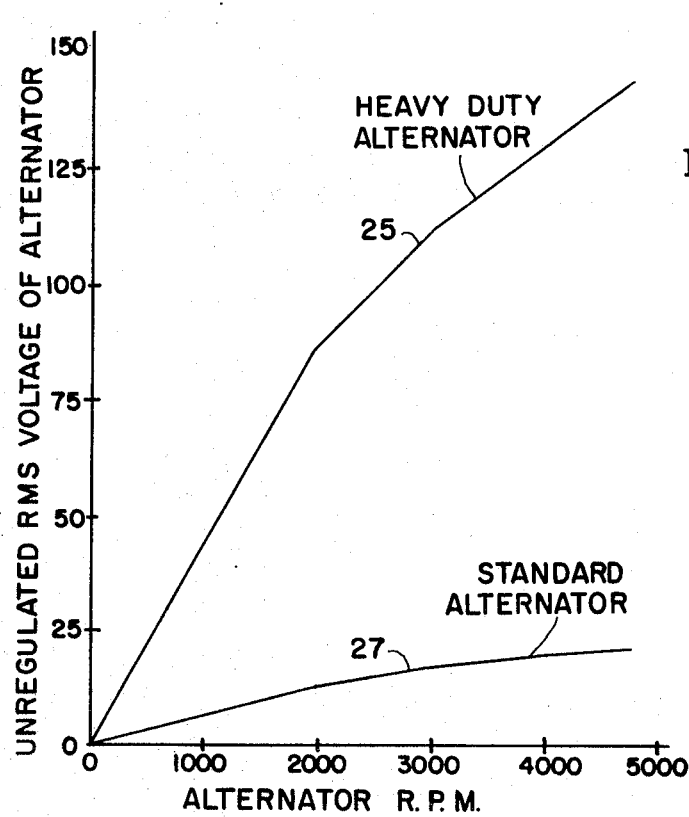
FIG. 2 is a graphic comparison of the unregulated output voltage amplitude versus engine speed characteristics of a heavy duty alternator with that of a conventional alternator.

Referring to FIG. 1, rotary field winding 10 which is rotated by the engine is included on the rotor of a heavy duty alternator 11. The winding 10 is connected to slip rings 12 and 14 that respectively contact brush 16 and brush 18 which is grounded. Heavy duty stator windings 20, 22 and 24 each have on the order 7 times more turns than the stator windings of a conventional automotive alternator. The windings, therefore, cooperate with the magnetic flux of the rotating field winding 10, when the alternator is in its unregulated mode, to develop an alternating voltage of much greater amplitude than the voltage developed by a conventional alternator operating under similar conditions. FIG. 2 of the drawing illustrates a curve 25 of the output voltage amplitude versus engine speed of the heavy duty alternator 11 and the corresponding curve 27 of a conventional alternator. The voltages represented by curves 25 and 27 are determined according to the scale along the vertical axis, while the alternator r.p.m. of each alternator is determined according to the scale along the horizontal axis.

The stator windings of the alternator 11 are delta connected to form junctions 26, 28 and 30, which are connected to junctions 32, 34 and 36 respectively of delta connected heater load 38, which is physically located near fan 47 of the conventional heating system so that air heated by it can be forced into the passenger compartment, and to terminals 40, 42 and 44 of the full wave rectifier 46. The heater elements are made of a resistive wire, such as Nichrome (trademark of Driver-Harris Co. for their brand of a nickel-chrominum alloy), which generates heat when an alternating current flows through it. The resistance of the heater load 38 is chosen so that its elements develop a comparatively small amount of heat when the alternator is in its regulated mode.

To maintain alternator 11 in its regulated mode, field winding 10 is energized by a regulated current provided by coupling the DC output of rectifier 46 through regulator circuit 50 in the known manner. While the alternator is maintained in its regulated mode, an AC voltage of regulated amplitude is generated across resistive heater load 38, and a DC voltage of regulated amplitude is maintained at output terminal 51 of rectifier 46. Since the resistance of heater load 38 is selected so that very little heat is generated thereby when alternator 11 is operating in its regulated mode it is not necessary to provide the expensive switching mechanisms of the prior art systems for connecting and disconnecting it from the alternator. The direct current output at terminal 51 is applied through diode 64 and normally closed contacts 52 and 54 of relay 56 to charge automotive storage battery 58, and to terminals 60 and 62 for supplying the direct current load 61 connected thereacross, which might be comprised of the automotive ignition system, lights, radio, air conditioners, etc. Diode 64 isolates battery 58 from regulator 50 to prevent the battery from discharging through field winding 10 when the alternator is not operating.

Relay 56 also includes normally open contacts 66, 68 which are arranged when closed to provide a bypass for the field current thus rendering regulator 50 ineffective so alternator 11 will operate in its unregulated mode. Energizing coil 78 of relay 56 has terminal 79 connected to ground and terminal 80 connected in series with quick heat on switch 81, safety switch 82, and the positive terminal of battery 58. Also connected to terminal 80 is series connected diode 85 and fan 47. The diode isolates coil 78 from energy supplied to fan 47 when the conventional heater is being used. Quick heat switch 81 may be a simple single pole, single throw switch wherein contacts 83 and 84 are opened and closed according to the desires of an operator, or it may include a timing and control mechanism which opens the contacts a predetermined time after they are closed. It could also include a temperature sensitive mechanism which opens the contacts in response to a sensed temperature.

In operation, if quick heat is required contacts 83 and 84 are closed whereupon battery 58 supplies an activating current through energizing coil 78 of relay 56 and through diode 85 to operate fan 47. Subsequently, normally open contacts 66 and 68 are closed thereby rendering regulator 50 ineffective, and normally closed contacts 52 and 54 are opened thereby disconnecting battery 58 and the DC load 61 from output 51. Since regulator 50 is in effect removed from the circuit, an unregulated amount of current is supplied to rotating field winding 10, and alternator 11 operates in its unregulated mode to generate an alternating voltage whose amplitude, although being a function of the angular velocity of field winding 10, is much greater even when the engine is idling than the amplitude of the regulated voltage. Consequently, an unregulated AC voltage having a RMS value on the order of 7 times as great as the RMS value of the regulated voltage will be developed across heater load 38. Since the heat generated by load 38 depends on the power dissipated in the resistive elements thereof and since the power dissipation varies with the square of the RMS voltage, the amount of heat generated by the resistive elements will be on the order of 50 times that generated in the regulated mode. For instance, the system might change 60 watts of power into heat while operating in the regulated mode as compared to 3,000 watts in the unregulated mode. The 60 watts of power cause an increase in temperature on the order of 1° F. in the discharge air of a standard automotive heater with the fan operating at maximum speed. Therefore, the system is designed so that an unobjectionable amount of heat is generated when the alternator is operated in its regulated mode, while providing a sufficient amount of instant heat to rapidly warm the interior of the automotive vehicle and simultaneously defrosting the windshield when the alternator is operated in its unregulated mode. Moreover, because the DC load 61 has been removed from the output 51 there is no danger of damaging the electrical system of the vehicle. When contacts 83 and 84 are opened to reconnect the battery thereto and to return the alternator to its regulated mode, battery 58 will be rapidly recharged by heavy duty alternator 11.

Safety switch 82 can be of the temperature sensitive, bimetal variety. It is located near heater load 38 to sense the temperature thereof. If, for example, fan 47 fails to operate when the alternator is switched to its unregulated mode the heating elements become heated to a critical temperature, safety switch 82 will open to subsequently deenergize relay coil 78 thereby returning the alternator to its regulated mode of operation.

Although the alternator 11 has been described as a three phase machine, any alternator which is capable of operating in regulated and unregulated modes of operation could be utilized in its place. Also, even though the preferred embodiment of the invention has been described in reference to a quick heat generating system including elements whose resistance does not substantially change with temperature deviation it is contemplated that load 38 could be replaced by or used with some other load capable of utilizing the unregulated voltage of the alternator, e.g., if the load resistors were made of a material with a negative temperature coefficient the power difference between the regulated and unregulated mode could be increased for a given difference in generated voltage between the two modes.

What has been described, therefore, is a simple, inexpensive and reliable, quick heat generating system for a vehicle which is capable of producing enough heat for simultaneously defrosting the windshield and heating the interior compartment of the vehicle without applying a voltage of excessive amplitude to the electrical system of the vehicle.

We claim:

1. An electrical power generating system having generator means, such electrical power generating system including in combination:

first load means connected to the generator means and being continuously energized by the operation thereof;

regulator means connected to the generator means and regulating the output voltage thereof;

second load means;

relay means with a set of normally closed contacts and a set of normally open contacts, said set of normally open contacts being connected to bypass said regulator means when closed, and said set of normally closed contacts being connected between said second load means and the generator means, the generator means thereby normally supplying a regulated voltage to said first and second load means; and said relay means being operable such that said set of normally closed contacts open to disconnect said second load means from the generator means and said normally open set of contacts close to bypass said regulator means so that the generator means supplies an unregulated voltage to said first load means.

2. The electrical power generating system of claim 1 wherein if the generating means is operated in its unregulated mode it provides an output voltage which has a substantially greater amplitude than the output voltages of conventional automotive generators operated in their unregulated modes.

3. An auxiliary heat generating system for supplying heat to the passenger compartment of an automotive vehicle, such auxiliary heat generating system including in combination:

electrical generator means for generating an alternating current voltage across first output terminals;

heating element means directly connected to said first output terminals;

rectifier means connected to said electrical generator means and providing a direct current voltage across second output terminals;

regulator means connected between said second output terminals and the electrical generator means and causing a regulated alternating current voltage across said first output terminals and a regulated direct current voltage across said second output terminals;

load means requiring a regulated direct current voltage;

relay means with a set of normally closed contacts and a set of normally open contacts, said set of normally open contacts being included in a circuit connected across said regulator means for bypassing the same, and including:

set of normally closed contacts being connected between said load means and said second output terminals such that said generator means normally supplies a regulated alternating current voltage to said heating element means and a regulated direct current voltage to said load means; and said relay means being operable so that said normally closed contacts open to disconnect said load means from said second output terminals and said normally open set of contacts close to bypass said regulator means so that said generator means supplies an unregulated alternating current voltage to said heating element means.

4. The electrical power generating system of claim 3 wherein said heating element means has a negative temperature coefficient.

5. The auxiliary heat generating system of claim 3 wherein said relay means includes an energizing coil and the system further includes switching means for connecting an energizing voltage to said energizing coil which simultaneously closes said normally open set of contacts and opens said normally closed set of contacts during the application of said energizing voltage.

6. The auxiliary heat generating system of claim 5 wherein a temperature sensitive switching means having a set of normally closed contacts is connected in series with said energizing coil, said temperature sensitive switching means being responsive to a first selected threshold temperature to open its contacts to thereby deenergize said energizing coil consequently returning said generator means to its regulated mode of operation provided said electrical generator means was previously being operated in its unregulated mode of operation.

7. A heat generating system for use in an automotive vehicle including in combination:

generator means adapted to provide at the output terminals thereof a regulated output voltage of given amplitude with the same being operated in a regulated mode and an unregulated output voltage of substantially greater amplitude than said given amplitude if operated in an unregulated mode;

heating element means permanently connected to said output terminals of said generator means and providing an insignificant amount of heat in response to said regulated output voltage and providing a substantial amount of heat in response to said unregulated output voltage; and control circuit means connected to said generator means for determining the mode of operation thereof.

8. The heat generating system of claim 7 further including load means requiring a regulated voltage;

regulator means coupled to said generator means for controlling the mode of operation thereof; and switching means having first and second portions, said first portion coupling said load means to said output terminals of said generator means, said second portion being coupled to said regulator means, said switching means being operable to first condition so that said first portion connects said load means to said generator means and said second portion renders said regulator means operative so that said generator means develops a regulated voltage, said switching means being operable to a second condition so that said first portion disconnects said load means from said generator means and said second portion renders said regulator means inoperative so that said generator means develops an unregulated voltage.

9. The heat generating system of claim 7 wherein, said generator means is a rotating field alternator having an increased number of turns on its stator windings with respect to a standard automotive rotating field alternator and providing an unregulated alternating current voltage having an unregulated amplitude on the order of 7 times the unregulated amplitude of the output voltage of the standard rotating field alternator operating at the same angular velocity.